United States Patent [19]
Price

[11] 4,234,910
[45] Nov. 18, 1980

[54] HEAD-SUPPORTED ILLUMINATION DEVICE

[76] Inventor: Linda D. Price, 6025 Sea Side Walk, Belmont Shores, Calif. 90803

[21] Appl. No.: 888,016

[22] Filed: Mar. 20, 1978

[51] Int. Cl.³ .......................... F21L 15/14; F21V 7/04
[52] U.S. Cl. ................................... 362/105; 350/96.1; 362/32; 362/264; 362/345; 362/804
[58] Field of Search ................ 362/32, 105, 106, 107, 362/264, 373, 345, 804; 350/96.1, 96.19, 96.24, 96.26, 96.3, 96.34

[56] References Cited
U.S. PATENT DOCUMENTS

| | | | |
|---|---|---|---|
| 3,586,851 | 6/1971 | Rudolph | 362/32 |
| 3,634,676 | 1/1972 | Castellano | 362/105 |
| 3,681,592 | 8/1972 | Hugelshofer | 362/32 |
| 3,930,103 | 12/1975 | Chimura | 350/96.34 |
| 3,951,139 | 4/1976 | Kloots | 362/105 |

*Primary Examiner*—Donald P. Walsh
*Attorney, Agent, or Firm*—Fulwider, Patton et al.

[57] ABSTRACT

An extremely lightweight, high-intensity illumination device utilizing polymer optical fibers to transmit light from a remote light source, and having a head-supported frame of the eyeglass type, in which the fibers are terminated in two or more bundles to provide a converging light pattern with minimal shadow effects. The remote light source employs a combination of dielectric mirrors and a heat-resistant glass rod to filter substantially all heat-producing infrared radiation from the light emitted by the source.

23 Claims, 5 Drawing Figures

U.S. Patent  Nov. 18, 1980  4,234,910
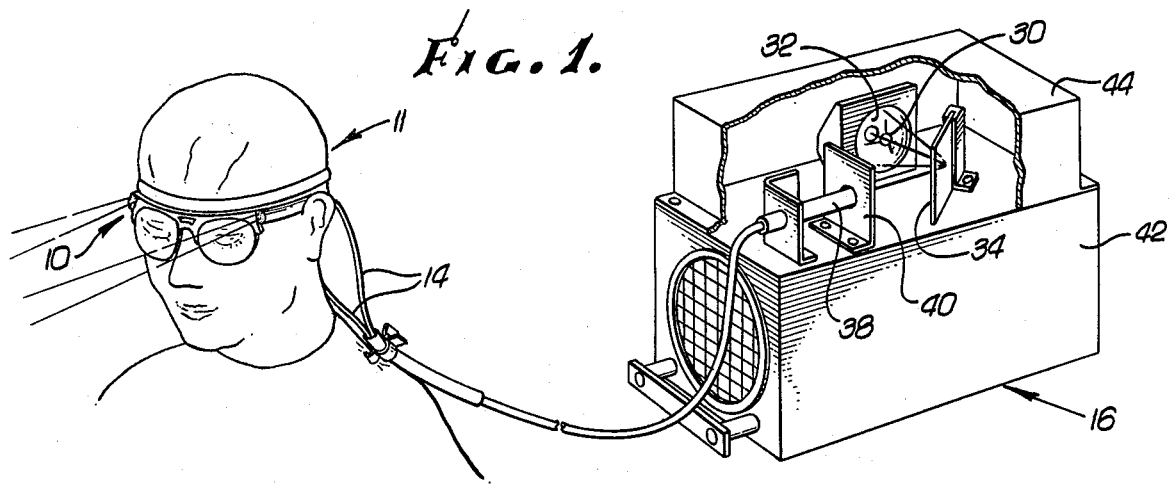
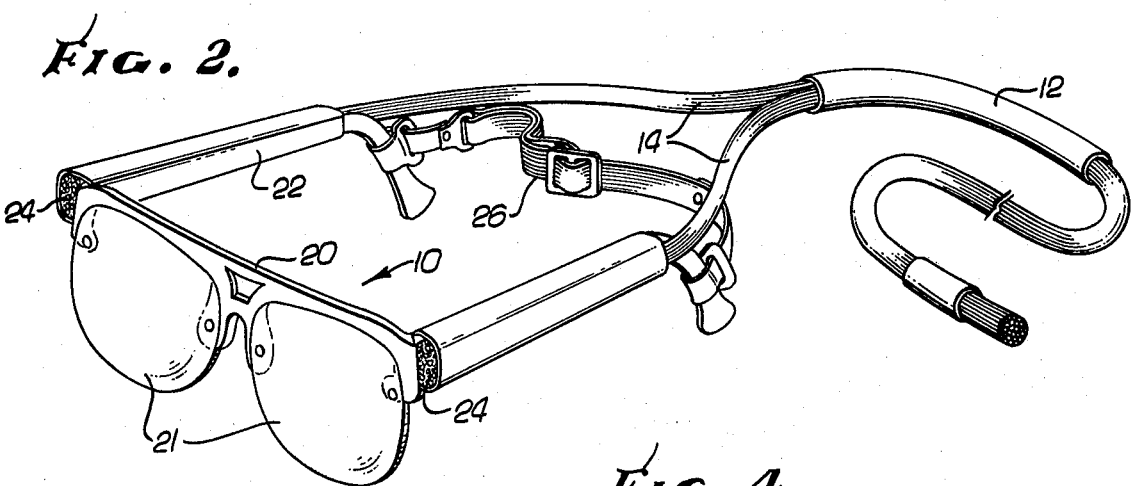
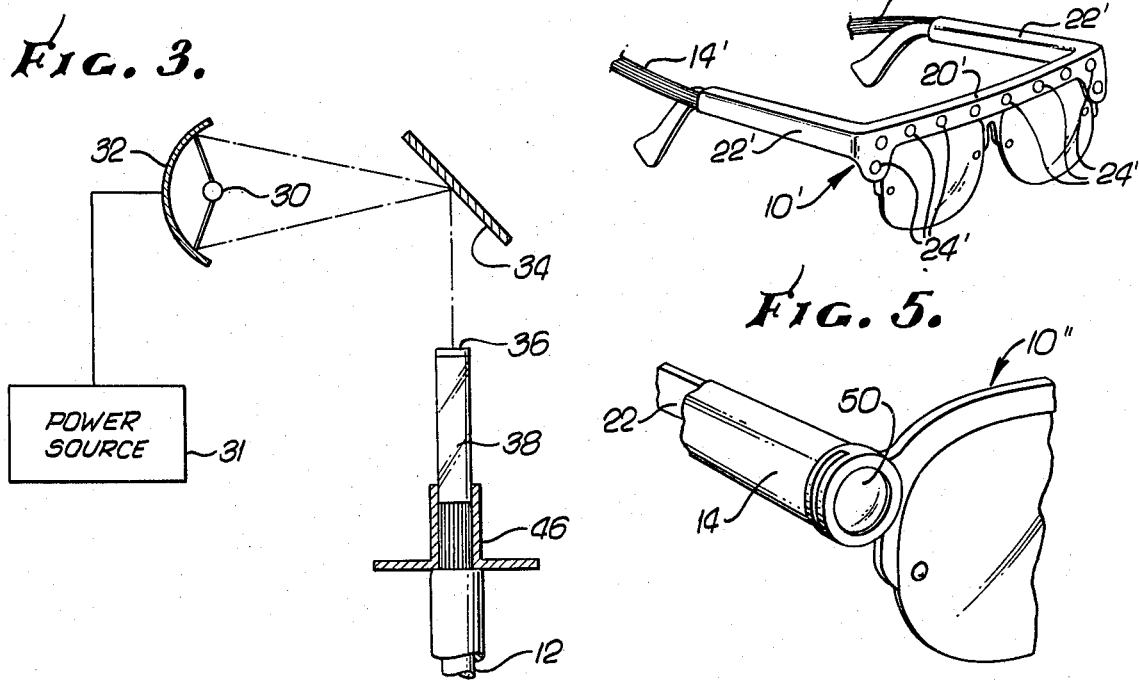

HEAD-SUPPORTED ILLUMINATION DEVICE

BACKGROUND OF THE INVENTION

This invention relates generally to illumination devices, and, more particularly, to illumination devices of the type used by physicians and surgeons to provide a high intensity light source with an area of illumination controllable without use of the hands, usually by head movement.

One illumination device of this general type consists of a headband supporting a conventional incandescent lamp and a reflector. A device of more recent development consists of a headband which utilizes light-conducting glass optical fibers and a remote light source to provide illumination. In this latter device, a bundle of glass optical fibers is mounted with a lens on the headband and projects light in front of the wearer.

Illumination devices of both these types suffer from the principle disadvantage that they are much too heavy and cumbersome to wear for prolonged periods. Glass optical fibers are also relatively fragile and inflexible, and typically utilize a relatively heavy sheathing material. Attempts to replace the heavy glass fiber and sheathing combination with lightweight, polymer optical fibers, have hitherto been largely unsuccessful, except at very low light intensities. Connection of polymer optical fibers to a high-intensity light source generally results in melting of the fibers when the luminous flux delivered by the light source exceeds approximately 200 lumens. Ideally, light sources delivering over 1,000 lumens are preferred for surgical applications.

Although the use of glass optical fibers permits the transmission of light at a relatively high luminous flux level, glass fibers suffer from the aforementioned disadvantages of relatively high weight, fragility, and inflexibility. These characteristics unduly restrict the head movement of the wearer, and the fibers may even break as a result of repeated head movements.

Moreover, because of the relatively large weight of illumination devices of both the glass fiber-optic type and the conventional incandescent type, such devices usually provide only a single, relatively narrow area of illumination. Such narrow field illumination from a single light source makes it difficult to cast light into a work area without causing shadows.

Yet another disadvantage of the aforementioned illumination devices is that a wearer who requires prescription eyeglasses must wear, in addition to his eyeglasses, a cumbersome head-mounted illumination device to which he is not easily accustomed. Furthermore, so that the light is emitted at eye level, such illumination devices are often positioned to the center and in front of the wearer's eyeglasses, and thereby present a risk of partially obstructing the wearer's vision.

It will be apparent from the foregoing that there is a significant need, particularly felt in the medical profession, for a lightweight illumination device which may be worn on the head, but which produces light at luminous flux levels well in excess of 200 lumens, preferably from more than one point source, to minimize shadows, and preferably using an arrangement which does not necessitate the wearing of separate eyeglasses. The present invention satisfies this need.

SUMMARY OF THE INVENTION

The present invention resides in a high-intensity, head-supported illumination device of extremely light weight, providing balanced lighting and comfortable, unrestricted head movement for the wearer. Basically, and in general terms, the illumination device of the invention comprises an eyeglass-type frame, a bundle of lightweight, polymer optical fibers terminating at the frame in at least two spatially separated smaller bundles, and a remote light source capable of supplying the optical fibers with high-intensity visible light without damage to the fibers.

The polymer optical fibers are terminated at the frame in such a manner as to provide focused light illuminating an area located a preselected distance in front of the frame. Use of lightweight, polymer optical fibers allows the fiber bundle to be divided into two or more smaller bundles for termination on each side of the frame, or, as contemplated in another embodiment of the invention in a spaced arrangement along the top of the frame, thus producing a wide field of balanced light, without the harsh shadows inherent in the use of a single point source of light.

It will be appreciated that the principal advantages of the invention are the substantial weight savings and freedom of head movement resulting from the use of the flexible, polymer optical fibers in conjunction with the frame. Polymer optical fibers weight approximately one-half as much as presently available glass optical fibers and their sheathing material. When such fibers are used in conjunction with a plastic frame similar to an eyeglass frame, the combination may be worn comfortably for extended periods of time. In addition to being lighter and less costly than glass, polymer optical fibers are more flexible, and allow the wearer greater head movement. The use of an eyeglass frame to support the fiber bundles also means that a wearer of prescription eyeglasses does not have to wear both his eyeglasses and a separate head-supported illumination device. Moreover, light from the polymer optical fiber bundles is emitted essentially at eye level, without any possibility of obstruction of the wearer's field of view.

The device of the invention may also include lenses, which may be removable, to provide for beam focusing at various distances from the wearer, or to provide an illumination area of any preselected size.

Another important aspect of the invention is a combination of dielectric mirrors and a glass rod located at the remote light source, to provide a high-intensity light source from which substantially all heat-producing components have been removed, and which will therefore not melt the polymer optical fibers, even at luminous flux levels ranging from 1,000 to 2,000 lumens.

Other aspects and advantages of the invention will become apparent from the following more detailed description, taken in conjunction with the accompanying drawings.

BRIEF DESCRIPTION OF THE DRAWINGS

FIG. 1 is a simplified perspective view of an illumination device embodying the principal features of the present invention, shown worn on the head, and coupled to a remote light source;

FIG. 2 is an enlarged perspective view of that portion of the device worn on the head, together with a portion of the optical fiber bundle;

FIG. 3 is a simplified diagrammatic view of the remote light source utilized by the invention device;

FIG. 4 is a perspective view of an alternate embodiment of the device; and

FIG. 5 is a fragmentary perspective view illustrating the use of a lens at the termination of the optical fiber bundles.

DETAILED DESCRIPTION

As shown in the drawings for purposes of illustration, the present invention is embodied in an illumination device of the head-supported type having a remote light source. The illumination device is particularly well suited for use by surgeons.

In accordance with the invention, there is provided an extremely lightweight combination of a frame, of the eyeglass type, indicated by reference numeral 10, supported on the head of a wearer 11, a bundle of polymer optical fibers 12 terminating at the frame in at least two smaller bundles 14, and a remote light source 16 capable of supplying the optical fibers with high-intensity visible light without heat damage to the fibers. In the embodiment shown in FIGS. 1 and 2, each of the fiber bundles 14 is terminated on one side of the frame 10 in such a manner as to illuminate an area at some preselected distance in front of the frame.

The eyeglass frame 10 illustrated includes an upper bridge member 20, to which are optionally secured two eyeglass lenses 21, and two side legs 22 attached to the respective ends of the bridge member and extending over the wearer's ears to help support the frame. The smaller fiber bundles 14 are rigidly secured to the side legs 22, by adhesive materials or by positioning in a channel or passage (not shown) formed in the side legs. The bundles 14 terminate, as indicated at 24, at the ends of the bridge member 20, so that the light emanating from the bundles is projected forwardly but slightly inwardly, with the two beams converging at some convenient point, such as approximately eighteen inches from the wearer's eyes.

To further secure the frame 10 to the wearer's head, an adjustable strap 26 is provided to link the side legs 22 at the back of the head. A spring-loaded clip 28 (FIG. 1) may be used to secure the bundle 12 to the wearer's garments, in order to minimize weight forces acting directly on the frame 10.

The optical fibers may be of any commercially available fiber-optic material, such as CROFON, manufactured by Du Pont Company, Wilmington, Del. In a presently preferred embodiment, 240 fibers of 0.020 inch diameter are used in the bundle 12. Fibers of square cross section could also be used, with an accompanying improvement in packing density and optical efficiency.

The light beam projected by each of the optical fiber bundles 14 may be focused to achieve a desired light pattern by beveling the ends of the fibers. Beveling may be accomplished by polishing of the fiber ends with cerium oxide powder on a buffing wheel at an angle of 20 to 30 degrees with respect to their longitudinal axis. For surgical applications, the preferred illumination pattern is a spot of light approximately eighteen inches in diameter at a distance of approximately eighteen inches from the device. A luminous flux in the range of 1,000-2,000 lumens is desirable for surgical applications.

In a presently preferred embodiment of the invention, the remote high-intensity light source 16 comprises an arc lamp 30 supplied by an appropriate electric power source, indicated at 31, and mounted near the focal point of a concave or parabolic dielectric mirror 32, which has the characteristic that it reflects visible light but allows transmission of radiation in the infrared region of the electromagnetic spectrum. The parabolic mirror 32 is positioned to direct the reflected light onto a flat dielectric mirror 34 which effectively removes still more of the heat-producing infrared radiation, while reflecting essentially only the visible light. Such dielectric motors are known in the art and are generally formed by vacuum deposition of a multi-layer dielectric coating material onto a glass surface. The concave and flat dielectric mirrors 32 and 34 are positioned such that the reflected light impinges normally on a third dielectric motor 36, which reflects heat producing infrared radiation while transmitting visible light. In the presently preferred embodiment of the invention, the third dielectric mirror 36 is formed by depositing a multi-layer dielectric coating material on the end surface of a heat-resistant glass rod 38.

In addition to providing a surface for formation of the third dielectric mirror 36, the heat-resistant glass rod 38 thermally insulates the polymer optical fiber bundle 12 from the light source, and absorbs heat to a limited degree. The glass rod 38 also serves to funnel and collect the reflected light, and thereby provide an efficient interface with the bundle 12 of the optical fibers. For optimum interface characteristics, the glass rod 38 should be the same diameter as the bundle 12.

To further reduce the transfer of heat to the polymer optical fibers, an aluminum baffle plate 40 (FIG. 1) is interposed between the flat dielectric mirror 34 and the glass rod 38. The baffle plate 40 has an aperture to allow passage of the reflected light. Additionally, a cooling fan (not shown) is utilized to dissipate the heat generated by the light source. As shown in FIG. 1, the arc lamp 30 and the mirrors 32, 34 and 36, together with the glass rod 38 and baffle plate 40, may be conveniently mounted on top of a housing 42 for the power supply 31. These elements may be protected by a removable cover 44. As best shown in FIG. 3, the glass rod 38 is secured to a cylindrical coupling 46 in which the bundle 12 is inserted.

Another embodiment of the invention is illustrated in FIG. 4, and comprises a modified eyeglass frame 10'. The polymer optical fibers are, as in the FIG. 2 embodiment described above, initially divided into two bundles 14, but are further divided into several smaller bundles for termination in a spaced arrangement along the bridge member 20' of the frame, as indicated at 24'. As in the FIG. 2 embodiment, the side legs 22' serve to hold the bundles 14 stationary, and the light beam projected by each optical fiber bundle may be focused to achieve the desired light pattern by beveling the ends of the fibers.

A further modification of the FIG. 2 embodiment of the invention is illustrated in FIG. 5. The modified frame 10'' has provision for mounting, preferably removably, a separate lens 50 for collimating or focusing the light from each bundle 14. A Fresnel lens is ideally suited for this purpose. Easily interchangeable lenses can then be effectively utilized for applications having different requirements of field of view and distance from the wearer. Such lenses could be used, for example, in the examination of the eyes, nose or throat.

It will be appreciated from the foregoing description that the present invention represents a significant advance in the field of illumination devices. In particular, it provides balanced illumination of very high-intensity, and yet is extremely light in weight, and therefore very convenient to use. It will also be appreciated that, although specific embodiments of the invention have been described in detail herein for purposes of illustration, various modifications may be made without departing from the spirit and scope of the invention. Accordingly, the invention is not to be limited except as by the appended claims.

I claim:

1. A high-intensity, lightweight, head-supported illumination device, comprising:
   a light source having a high-intensity lamp and filtering means for removing heat radiation emitted by said lamp, said filtering means including at least one dielectric mirror for separating visible light from infrared radiation;
   light collecting means including heat-resistant glass for receiving filtered visible light from said dielectric mirror;
   lightweight, plastic fiber-optic light transmitting means adapted for connection to said light collecting means;
   head-supported means for securing said light transmitting means to the head; and
   means for terminating said light transmitting means at said head-supported means in such a manner as to project light forwardly of said head-supported means.

2. An illumination device as defined in claim 1, wherein said light transmitting means includes a bundle containing a plurality of optical fibers.

3. An illumination device as defined in claim 1, wherein said filtering means includes:
   at least one dielectric mirror for transmitting heat radiation; and
   at least one dielectric mirror for reflecting heat radiation.

4. An illumination device as defined in claim 1, wherein said filtering means includes:
   a concave dielectric mirror for reflecting visible light only;
   a second dielectric mirror for reflecting visible light only; and
   a third dielectric mirror for reflecting heat and transmitting visible light only.

5. An illumination device as defined in claim 1, wherein said filtering means further includes a heat-resistant glass rod.

6. An illumination device as defined in claim 1, wherein said light transmitting means includes a plurality of lightweight, polymer optical fibers.

7. An illuminating device as defined in claim 6, wherein said means for terminating including means for terminating said plurality of fibers in a plurality of bundles spaced along the width of said head-supported means.

8. An illuminating device as defined in claim 6, wherein said plurality of fibers is divided into at least two bundles, and said means for terminating includes means for terminating one of said bundles on each side of said head-supported means in such a manner as to project light from said bundles forwardly of said head-supported means.

9. An illuminating device as defined in claim 8, wherein said means for terminating said bundles includes a lens for focusing and directing light projected from least one of said bundles.

10. An illumination device as defined in claims 7 or 8, wherein said means for terminating said plurality of fibers includes ends of fibers that are beveled with respect to their longitudinal axes, to focus the light projected therefrom.

11. An illumination device as defined in claim 1, wherein said head-supported means comprises an eyeglass frame.

12. An illumination device as defined in claim 1, wherein said light source is a high-intensity lamp delivering a luminous flux of more than 200 lumens.

13. A high-intensity, lightweight, head-supported illumination device, comprising:
   a light source having a high-intensity lamp light collecting means, and at least one mirror for reflecting visible light from said lamp to said light collecting means, said mirror separating visible light from infrared radiation whereby heat emitted by said lamp is directed away from said light collecting means while high-intensity visible light is reflected thereto;
   lightweight light transmitting means including a plurality of polymer optical fibers and adapted for connection at a first end to said light collecting means in said light source to transmit light from said source through said optical fibers to a second end of said transmitting means;
   support means for securing said second end of said light transmitting means to the head of a user of said illumination device; and
   termination means for said second end of said light transmitting means for terminating said optical fibers at said support means in such a manner as to cause visible light from said source which passes through said optical fibers to project forwardly of said support means, whereby an area in front of the user of said illumination device is illuminated, and the area of illumination may be controlled by movement of the head of the user.

14. An illumination device as defined in claim 13, wherein aid light collecting means comprises a heat resistant glass rod for filtering light from said high-intensity source.

15. An illumination device as defined in claim 14, wherein said light source includes a dielectric mirror for directing visible light to said glass rod, and for directing heat radiation from said lamp away from said glass rod.

16. An illumination device as defined in claim 15, wherein said termination means comprises means for securing said optical fibers in a plurality of bundles spaced along the front of said support means.

17. An illumination device as defined in claim 15, wherein said termination device includes ends of said fibers that are beveled with respect to their longitudinal axes to focus the light projected therefrom.

18. An illumination device as defined in claim 15, wherein said support means comprises an eyeglass frame.

19. An illumination device as defined in claim 15, wherein said light source comprises a high-intensity lamp delivering a luminous flux of between 1000 lumens and 2000 lumens.

20. An illumination device as defined in claim 13, wherein said light source further includes heat baffle means interposed between said high-intensity lamp and said light collecting means to shield said light collection means from heat radiated by said high-intensity lamp.

21. An illumination device as defined in claim 13, wherein said light source includes first and second dielectric mirrors for reflecting visible light and transmitting infrared radiation.

22. An illumination device as defined in claim 13, wherein said light source includes first and second dielectric mirrors, said first mirror reflecting visible light and transmitting infrared radiation, and said second mirror transmitting visible light and reflecting infrared radiation.

23. A high-intensity, lightweight, head-supported illumination device, comprising:

an eyeglass frame including a bridge member and first and second side legs secured at opposite ends of said bridge member;

polymer fiber optic light transmitting means having a first end adapted for connection to a high-intensity light source and a second end, said light transmitting means including a plurality of lightweight polymer optical fibers divided into first and second bundles at said second end;

means rigidly securing said first bundle of fibers along said first side leg whereby said first bundle terminates adjacent a first end of said bridge member;

means rigidly securing said second bundle of fibers along said second side leg, whereby said second bundle terminates adjacent a second end of said bridge member;

lens means securable to said frame for terminating each of said first and second bundles, said lens means projecting and focusing light from said fibers forwardly of said frame; and means for securing said frame to the head of a user of said illumination device, whereby said light transmitting means extends along both sides of the user's head and projects light supplied to said fibers forwardly thereof.

* * * * *